Oct. 14, 1952  J. R. DARBEE  2,613,675

UNIVERSAL MOUTHPIECE FOR SMOKERS' PIPES

Filed Feb. 15, 1949

INVENTOR.
John R. Darbee.
BY
Harness, Dickey & Pierce
ATTORNEYS.

Patented Oct. 14, 1952

2,613,675

UNITED STATES PATENT OFFICE 2,613,675

UNIVERSAL MOUTHPIECE FOR SMOKERS' PIPES

John R. Darbee, Clawson, Mich.

Application February 15, 1949, Serial No. 76,606

5 Claims. (Cl. 131—225)

This invention relates broadly to new and useful improvements in smokers' pipes and more particularly to an improved mouthpiece or bit therefor that can be readily adapted for and applied to a wide variety of pipes.

The mouthpiece usually is the weakest part of a smoker's pipe. It is the part of the pipe that is most easily broken. Further, many smokers bite through the mouthpieces of their pipes to such an extent that they become useless. In either event it is necessary to take the pipe to a repair man in order to have the mouthpiece replaced. Since the end sockets of pipe stems are not uniform in size and shape, there is no standard mouthpiece that will fit all pipes, and a mouthpiece from one pipe ordinarily will not fit the stem of another pipe. Frequently, a pipe repair shop is not immediately available; or, if one is available, it frequently is inconvenient to take the pipe to the shop for repair. As a consequence, the pipe smoker often has a number of good pipes which are useless because the mouthpieces are broken or otherwise damaged.

An important object of the present invention is to provide a mouthpiece that can be readily adapted to substantially all pipe stems.

Another object of the invention is to provide a mouthpiece that can be attached securely to the stem of substantially any pipe.

Still another object of the invention is to provide a mouthpiece of the above-mentioned character that is relatively simple in construction and inexpensive to manufacture.

Other objects and advantages of the invention will be apparent during the course of the following description.

Figure 1:
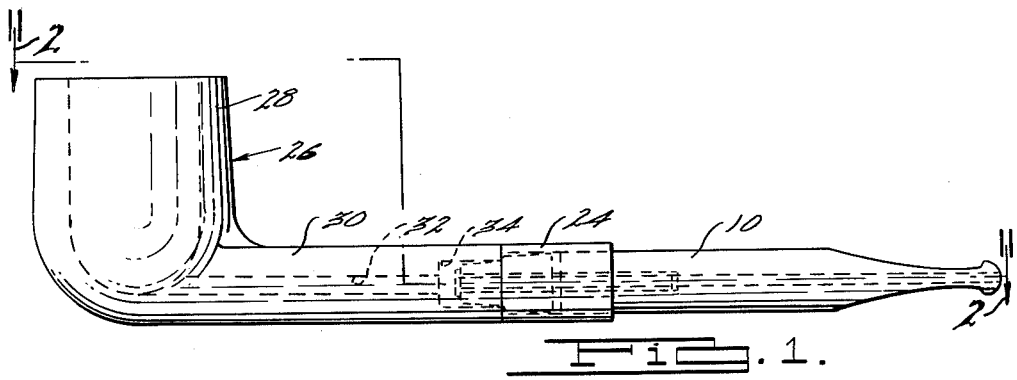
Figure 2:
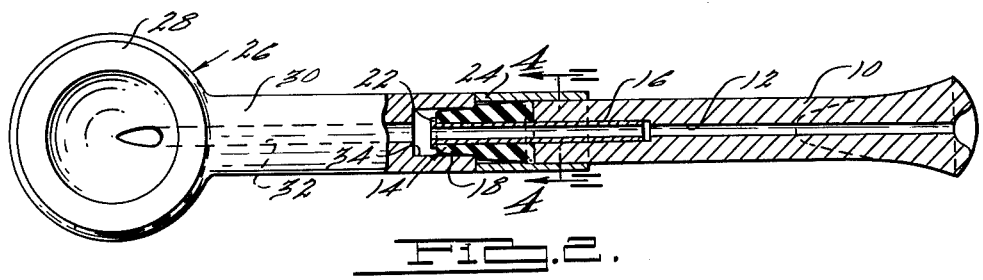
Figure 3:
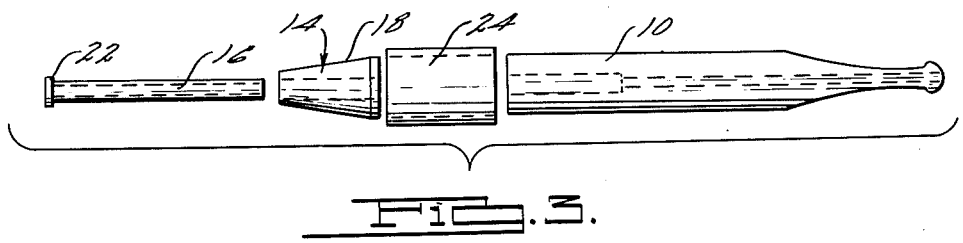
Figure 5:
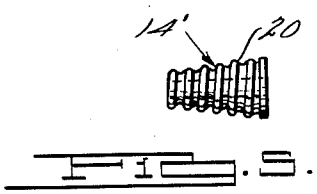
Figure 4:
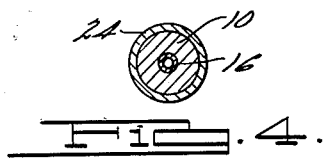

In the drawings forming a part of this specification, and wherein like numerals are employed to designate like parts throughout the same, Figure 1 is a side elevational view of a smoker's pipe having a mouthpiece embodying the present invention, Fig. 2 is a horizontal, longitudinal partial sectional view taken on the line 2—2 of Fig. 1, Fig. 3 is an exploded, side elevational view showing the several parts that make up the mouthpiece of this invention, Fig. 4 is a transverse, vertical sectional view taken on the line 4—4 of Fig. 2, and Fig. 5 is a side elevational view showing a modified adapter member for the mouthpiece.

Considered in certain of its broader aspects the invention is a universal mouthpiece for smokers' pipes. The shanks and stems of pipes vary considerably in size, shape, and diameter. The external surfaces of some pipes, and particularly of the pipe shanks or stems, are rough, whereas in other instances the shanks are smooth. In all instances the stem or shank is provided with an opening in the end face thereof which is adapted to receive and interconnect with a part of a bit or mouthpiece. This opening, however, varies considerably in size and depth. In some cases the opening may be formed directly in the wood material of the stem and in other cases the opening may be provided with a metal sleeve. This sleeve may be either plain or internally threaded. All of these variations in pipes makes it exceedingly difficult to devise a mouthpiece that is universally adapted to all pipe shanks.

It is the purpose of this invention to provide a replacement mouthpiece adapted, because of a special connector, to fit any shank of any smoking pipe within reasonable limits. This is accomplished by forming a connecting element on the forward end of the mouthpiece adapted to fit into the enlarged portion of the smoke duct at the rear of the shank of the bowl and by providing external means for bracing the joint as described in detail in the specification which follows.

As suggested, the present invention consists primarily of a mouthpiece for a smoker's pipe that can be sold as a separate item and is equipped with an adapter that will fit and securely attach the mouthpiece to substantially any type or size of pipe stem. In the drawing, the tubular tip or mouthpiece is designated by the numeral 10. It will be observed that the mouthpiece is more or less conventional in size and shape and that it has the usual longitudinal smoke passage 12.

According to the present invention, an adapter 14 of suitable shape and configuration is mounted on the forward end of the mouthpiece 10 and is fastened to the latter by a centrally disposed, axially extending, tubular member 16. The adapter 14 here shown is of generally frusto-conical shape, but it will be readily apparent that other shapes may be used depending primarily upon the nature of the material from which it is made and the extent to which it is deformable. In Figs. 1–4 I have shown the adapter 14 with a plain outer surface 18, and in Fig. 5 I have shown the adapter 14' with a corrugated or threaded outer peripheral surface 20.

The adapter 14 is disposed with the base portion thereof against the forward end of the mouthpiece 10, and the base of the adapter preferably coincides as exactly as possible with the end of the mouthpiece. The adapter 14 can be made from any suitable material which is essentially resilient and preferably is made from a soft yieldable rubber.

As suggested, a tube 16 extends axially through the adapter 14. A radial flange 22 on the forward end of the tubular member 16 seats rearwardly against the adapter 14. The rearward portion of tubular member 16 projects beyond the adapter 14 and the projecting portion thereof is press fitted in the passage 12. The forward terminal portion of the passage 12 preferably is somewhat enlarged as shown in Fig. 2 to accommodate the tube 16 without appreciably reducing or restricting the size of the passage.

A sleeve 24 fits snugly but slidably on the mouthpiece 10. The sleeve 24 is adjustable longitudinally along the mouthpiece 10 and, as shown in the drawing, the inner terminal portion of the mouthpiece is uniformly cylindrical so that the sleeve tightly frictionally engages the mouthpiece in different longitudinally adjusted positions on the mouthpiece and particularly in all adjusted positions in which it projects beyond the inner end face of the mouthpiece.

In Figs. 1 and 2 I have shown the mouthpiece assembly associated with a pipe 26 having the usual bowl portion 28 and shank or stem portion 30. The stem 30 has the usual smoke passage 32, and the end of the passage remote from bowl 28 is counterbored as at 34 to provide a socket in the free end of the shank 30 in the conventional manner.

To apply the mouthpiece assembly embodying the present invention to the pipe 26 it is necessary merely to press the adapter 14 into the counterbore 34. The tapered shape of the adapter 14 and the yieldable or deformable nature of the material from which it is formed makes it possible to wedge the adapter solidly into the counterbore 34. The sleeve 24 is then advanced on the mouthpiece 10 until it abuts the stem 30, as shown in Figs. 1 and 2. The snug fit between the sleeve 24 and mouthpiece 10 and the abutting engagement between the sleeve and the stem 30 strengthens the union between the adapter 14 and the stem and checks any tendency for the mouthpiece to bend or yield at the union under the weight of the bowl 26 or by reason of the resilient nature of the adapter. In the particular form of the invention shown in the drawing, the base of the adapter 14 covers the entire inner end face of the mouthpiece 10. Thus the base of the adapter 14 is coincident to the end of the mouthpiece 10 and the outer surface of the adapter extends flush with the outer cylindrical surface of the mouthpiece. As a consequence, the distortion produced in the adapter when it is forced into the pipe stem 30 causes the base portion to expand or swell outwardly against the sleeve 24 as shown in Fig. 2. Pressure exerted against the sleeve 24 by the radially expanded portion of the adapter 14 materially assists the frictional engagement between the sleeve and the mouthpiece in holding the sleeve butted against the end face of the stem 30. Also the sleeve 24 covers any portion of the adapter 14 which remains between the stem 30 and the mouthpiece 10 after the adapter has been pressed solidly into the socket 34.

I have found that the sleeve 24 used in conjunction with the adapter 14 provides a union which effectively holds the mouthpiece 10 fastened securely to the bowl 26 and which holds the mouthpiece properly in alignment with the stem 30 at all times. It will be readily apparent that the secure attachment of the mouthpiece to the pipe stem is due in part to the joint action of the adapter 14 and sleeve 24. These elements mutually contribute to the end result, and their mutual presence combined and correlated in the manner described is necessary to proper operation of the device.

The tubular member 16 preferably is made of metal, although any suitable material can be used. Its primary purpose is to attach the adapter 14 securely to the mouthpiece 10. However, the tubular member 16 also serves another important function in the combination; i. e., it provides a lining for the adapter 14 and thus prevents smoke and the like from coming directly into contact with and being contaminated by the material from which the adapter is made as it passes through the adapter. Some materials which are otherwise suitable for the adapter 14 impart an undesirable taste to the smoke. This contingency is entirely eliminated by lining the passage through the adapter in the manner shown.

As a rule, the adapter 14 having a plain tapered peripheral surface is adequate for most purposes, but in Fig. 5 I have shown an adapter 14' formed with a threaded or corrugated peripheral surface which has a superior holding action particularly in the case of a pipe of the type having an internally threaded metal insert in the pipe stem. In pipes of this type, the external threads or corrugations on the adapter coact with the internal threads of the insert to hold the mouthpiece more securely attached to the stem.

Having thus described the invention, I claim:

1. In a pipe having a bowl provided with a shank having a socket in the free end thereof and a mouthpiece having one end adapted to be received within said socket, wherein said mouthpiece comprises a tubular tip, a tube coaxial with said tip, a resilient tapered adapter secured to the tube, and a sleeve slidably and tightly fitting the surrounding tip and adapted to be moved longitudinally on the tip to engage the adapter and to abuttingly engage the free end face of the shank socket when the adapter is tightly held within the shank socket.

2. A mouthpiece for a pipe of the type having a shank provided with a socket, said mouthpiece comprising a tubular tip, a tube coaxial with said tip, a resilient tapered adapter secured to the tube, and a sleeve slidably and tightly fitting the surrounding tip and adapted to be moved longitudinally on the tip to abuttingly engage the free end face of the shank socket and to engage the adapter when the adapter is tightly held within the shank socket.

3. A mouthpiece for a pipe of the type having a shank provided with a socket, said mouthpiece comprising a tubular tip, a tube coaxial with said tip, a resilient tapered adapter secured to the tube and adapted to be inserted into said socket, said tube having external corrugations engageable with the wall of the socket to hold the adapter securely therein, and a sleeve slidably and tightly fitting the surrounding tip adapted to be moved longitudinally on the tip to abuttingly engage the free end face of the shank socket and to engage the adapter when the latter is tightly held within the shank socket.

4. A universal mouthpiece for smokers' pipes comprising a tip having a longitudinal smoke passage, an adapter of resilient material mounted on and fastened securely to the forward end of the tip, said adapter having a longitudinal bore communicating with the smoke passage of the tip and being longitudinally exteriorly tapered forwardly from the tip, a sleeve surrounding and concentric to said tip and movable longitudinally thereon, said adapter adapted to be inserted into the shank portion of a pipe, and said sleeve being movable on the bit into abutting engagement with the free end face of the shank, whereby the adapter, the sleeve, and the free end face of the shank mutually co-operate to hold the mouthpiece fastened securely to and aligned with the stem of the pipe.

5. A universal mouthpiece for smokers' pipes comprising a tip having a longitudinal smoke passage, an adapter of resilient material mounted on and fastened securely to the forward end of the tip, said adapter having a longitudinal bore communicating with the smoke passage of the tip and being longitudinally tapered forwardly from the tip, and a sleeve frictionally engaging with said tip, said sleeve being longitudinally movable on the tip and projectible beyond the forward end of the tip so as to at least partially surround said adapter, said adapter being insertable into the shank portion of a pipe bowl so as to frictionally grip the same and said sleeve being movable on the tip and into abutting engagement with the free end face of the shank, said sleeve being held in such abutting relation by frictional engagement with the tip, said adapter and said sleeve mutually co-operating with the shank to hold the mouthpiece attached securely to the shank.

JOHN R. DARBEE.

REFERENCES CITED

The following references are of record in the file of this patent:

UNITED STATES PATENTS

| Number | Name | Date |
|---|---|---|
| 61,283 | Truman | Jan. 15, 1867 |
| 165,814 | Fritz | July 20, 1875 |
| 423,197 | Weldon | Mar. 11, 1890 |
| 817,633 | Eshelman | Apr. 10, 1906 |
| 1,153,771 | Demuth | Sept. 14, 1915 |
| 1,554,353 | Johnson | Sept. 22, 1925 |
| 2,452,397 | Shotton | Oct. 26, 1948 |